(12) United States Patent
Patel

(10) Patent No.: US 10,282,794 B2
(45) Date of Patent: May 7, 2019

(54) SYSTEM AND METHOD FOR DETERMINING ENERGY AND GREENHOUSE GAS (GHG) APPORTIONMENT

(71) Applicant: SIGNIFY HOLDING B.V., Eindhoven (NL)

(72) Inventor: Maulin Dahyabhai Patel, Tuckahoe, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 393 days.

(21) Appl. No.: 14/913,574

(22) PCT Filed: Aug. 27, 2014

(86) PCT No.: PCT/IB2014/064078
§ 371 (c)(1),
(2) Date: Feb. 22, 2016

(87) PCT Pub. No.: WO2015/028944
PCT Pub. Date: Mar. 5, 2015

(65) Prior Publication Data
US 2016/0203568 A1    Jul. 14, 2016

Related U.S. Application Data

(60) Provisional application No. 61/871,137, filed on Aug. 28, 2013.

(51) Int. Cl.
*G06Q 10/00* (2012.01)
*G06Q 50/06* (2012.01)
(Continued)

(52) U.S. Cl.
CPC ............. *G06Q 50/06* (2013.01); *G06Q 10/10* (2013.01); *G06Q 30/0206* (2013.01)

(58) Field of Classification Search
CPC ......... G06Q 10/00; G06Q 40/06; G06F 17/60
(Continued)

(56) References Cited

U.S. PATENT DOCUMENTS

| | | | |
|---|---|---|---|
| 8,706,650 B2 * | 4/2014 | Ozog | G06Q 10/06 705/412 |
| 2003/0023540 A2 * | 1/2003 | Johnson | G06Q 10/04 705/37 |

(Continued)

FOREIGN PATENT DOCUMENTS

WO    2012071485 A2    5/2012

OTHER PUBLICATIONS

Mentore Vaccari et al, "A methodology for the calculation of Greenhouse Gases emissions from office-based projects", Faculty of Engineering, Univ. of Crescia, Research centre on appropriate technologies for environmental management in developing Countries, pp. 1-90.

(Continued)

*Primary Examiner* — Romain Jeanty

(57) ABSTRACT

System and methods for appointing energy and environmental costs to provide separate billing statements for operation of business and/or healthcare related equipment is disclosed. The method determining a cost associated with a total amount of energy consumed and a cost for operation of selected equipment with regard to usage and demand. In addition, the greenhouse gas emissions associated with the generation of the energy required to generate the total amount of energy and operate the selected equipment is also determined.

19 Claims, 5 Drawing Sheets

(51) Int. Cl.
*G06Q 30/02* (2012.01)
*G06Q 10/10* (2012.01)

(58) Field of Classification Search
USPC .......................................................... 705/7.35
See application file for complete search history.

(56) References Cited

U.S. PATENT DOCUMENTS

| | | | | |
|---|---|---|---|---|
| 2003/0069743 A1* | 4/2003 | Nordrum | ............... | G06Q 10/06 705/28 |
| 2003/0216971 A1* | 11/2003 | Sick | ................ | G01D 4/004 705/7.36 |
| 2010/0042453 A1 | 2/2010 | Scaramellino et al. | | |
| 2010/0070423 A1 | 3/2010 | McConnell et al. | | |
| 2010/0138190 A1 | 6/2010 | McConnell et al. | | |
| 2010/0174643 A1* | 7/2010 | Schaefer | ............... | G06Q 20/102 705/40 |
| 2010/0217642 A1* | 8/2010 | Crubtree | ............... | G06Q 10/00 705/7.12 |
| 2010/0217651 A1* | 8/2010 | Crabtree | ............... | G06Q 10/00 705/7.22 |
| 2010/0332373 A1* | 12/2010 | Crabtree | ................ | G06Q 40/04 705/37 |
| 2011/0231028 A1* | 9/2011 | Ozog | ..................... | G06Q 10/06 700/291 |
| 2012/0078687 A1* | 3/2012 | Ghosh | ............... | G06Q 30/0207 705/14.1 |
| 2012/0173456 A1* | 7/2012 | Hirl | ........................ | G06Q 40/06 705/36 R |
| 2013/0134962 A1 | 5/2013 | Kamel et al. | | |
| 2013/0144451 A1* | 6/2013 | Kumar | ................... | G05B 13/02 700/291 |
| 2014/0040089 A1* | 2/2014 | Hirl | ........................ | G06Q 40/06 705/35 |
| 2015/0310461 A1* | 10/2015 | Lee | ..................... | G06O 30/0202 705/412 |
| 2015/0324817 A1* | 11/2015 | Chen | .................. | G06Q 30/0202 705/7.31 |

OTHER PUBLICATIONS

Department for Environment, Food and Rural Affairs, "Guidance on how to measure and report your greenhouse gas emissions", Sep. 2009, www.defra.gov.uk.

* cited by examiner

SYSTEM AND METHOD FOR DETERMINING ENERGY AND GREENHOUSE GAS (GHG) APPORTIONMENT

CROSS-REFERENCE TO PRIOR APPLICATIONS

This application is the U.S. National Phase application under 35 U.S.C. § 371 of International Application No. PCT/IB2014/064078, filed on Aug. 27, 2014, which claims the benefit of U.S. Provisional Patent Application No. 61/871,137, filed on Aug. 28, 2013. These applications are hereby incorporated by reference herein.

This application is related to the field of energy and greenhouse gas (GHG) management and more particularly to a system for determining apportionment of energy usage and GHG emissions in different applications.

Work from home is a growing trend. According to a recent Reuter's poll, approximately 10% of global workforce work from home every day. In addition, home healthcare is another growing trend. More and more people are opting to receive healthcare services at home which can be more cost-effective than prolong stay at hospital.

The home healthcare equipment, home office equipment and the employer provided plug-in hybrid vehicle draw electricity from in-home power circuit, which increases the energy bill paid by the home owner. Many employers reimburse their employees for home-office energy costs at a flat rate because currently there are no known methods to apportion the incremental electricity bill incurred due to home office equipment or plug-in hybrid vehicle. Similarly, there are no methods to apportion the incremental electricity bill incurred by home healthcare equipment. In this case, the portion of the electrical bill used to power home healthcare equipment may be tax-deductible.

Typically, electricity tariff has three main components. First, the energy usage charge, which is based on actual usage of electricity measured in kilowatt hours (kWHr). The second is the peak demand charge. That is, demand is defined as the average rate at which electricity is consumed during a time interval (e.g., 15 minute intervals). Demand is measured in kilowatts (kW). The maximum actual demand for all intervals in a time interval (i.e., a month) is called the peak demand. Utility distribution companies charge their customers in proportion to their peak demand. Finally, there are taxes, surcharges, rebates and incentives that are added/subtracted to the energy bill. In addition, the rates (i.e., the monetary charge, tariff) of electricity vary based on time-of-day and the particular season. Typically, utility companies charge higher tariffs (or rates) during on-peak demand periods or durations and lower tariffs during off-peak demand periods or durations.

Even if home healthcare equipment, home office equipment and plug-in hybrid vehicle are metered separately, it is not straightforward to translate energy use into energy cost mainly due to peak demand charges. For example, if home-office equipment consume a known percentage (i.e., x %) of total energy consumed by the home, their contribution to the total energy bill may not be the known percentage (x %) due to time-of-use tariff and peak demand charges. Creating a separate utility account for home-office/healthcare equipment and billing these equipment independently is cost prohibitive. Moreover, the effective rate per KWHr is lower for macro billing than micro-billing because each bill has some fix charges and retail electricity rates are generally higher than bulk electricity rates.

In addition, regulations in the US include a requirement for organizations to accurately quantify and report their Greenhouse Gas (GHG) emissions (e.g. EPA's Mandatory GHG Reporting Requirements and American Clean Energy Security Act). Executive Order 13514 requires government agencies to collect and report their comprehensive GHG inventory. However, currently there are no methods for tracking the environmental footprint of home office equipment.

Tracking the GHG emissions due to home office equipment (or healthcare equipment) is not straightforward because power supplied to a home may originate from a variety of sources. For example, electrical energy (or power) is typically provided from a power grid. However, with recent advances in technology, other power sources, such as solar panels, on-site diesel/gas generator, community renewable sources, geothermal, etc., may be available to the home. Moreover, the fraction of electricity supplied by the power grid versus rooftop solar units varies in real-time, which affects the resultant utility bill and further complicates the GHG emission computation.

Hence, there is a need in the industry for a method for determining the Greenhouse Gas emissions and the energy cost of home-office/healthcare equipment that may be properly accounted for so that an employee (and employer) may be accurately charged for the environmental footprint (GHG emission) and the costs involved in providing home-office equipment or the user may adequately determine the cost and GHG emissions for the use of healthcare equipment.

It is an object of the present invention to provide methods and systems for determining energy costs and associated environmental impact of equipment used in the home that are not associated with personal use.

It is an object of the present invention to provide methods and systems for determining an apportionment of energy consumed and environment footprint of consumed energy to separate equipment that is operated for personal usage and for business or healthcare usage.

In accordance with the principles of the invention, a system including an application server comprising a processor in communication with a memory, the memory including code which when assessed by the processor causes the processor to: receive at least one energy usage and an energy demand corresponding to each of the at least one energy usage during a known period, receive a total energy usage and a corresponding total energy demand, during the known period, determine a residual energy usage from the total energy usage and the at least one energy usage and a residual energy demand from the total energy demand and the energy demand corresponding to each of the at least one energy demand, determine a maximum energy demand of the received energy demand over the known period, wherein the maximum energy demand is a maximum of an average value of the received energy demand determined in each of a plurality of second known periods, determine a maximum total energy demand over the known period, wherein the maximum total energy demand is a maximum of an average value of the total energy demand determined in each of the plurality of second known periods, determine a cost of the total energy usage based at least one the total energy usage and the maximum total energy demand, determine a cost of the residual energy usage based at least on the determined residual energy usage and the maximum residual energy demand, and apportion the energy cost of equipment operation based on the cost of total energy usage and the cost of the residual energy usage. The average value may be a running average wherein the second known time periods overlap.

In another aspect of the invention, a method for apportioning costs of equipment operations is disclosed wherein the method comprises receiving at least one energy usage and an energy demand corresponding to each of the at least one energy usage during a known period, receiving a total energy usage and a corresponding total energy demand during the known period, determining a residual energy usage from the total energy usage and the at least one energy usage and a residual energy demand from the total energy demand and the energy demand corresponding to each of the at least one energy usage, determining a maximum energy demand of the energy demand over the known period, wherein the maximum energy demand is a maximum of an average value of the energy demand corresponding to each of the at least one energy usage determined in each of a plurality of second known periods, determining a maximum total energy demand over the known period, wherein the maximum total energy demand is a maximum of an average value of the received total energy demand determined in each of the plurality of second known periods, determining a cost of the total energy usage based on at least the total energy usage and the maximum total energy demand, determining a cost of the residual energy usage based on at least the determined residual energy usage and the maximum residual energy demand, and apportioning the energy costs of equipment operation based on the cost of the total energy usage and the cost of the residual energy usage.

In another aspect of the invention, a non-transitory device including a computer program product that includes computer code, which causes a processor to receive at least one energy usage and an energy demand corresponding to each of the at least one energy demand during a known period, receive a total energy usage and a corresponding total energy demand during the known period, determine: a residual energy usage from the total energy usage and the at least one energy usage; and a residual energy demand from the total energy demand and each of the energy demand corresponding to each of the at least one energy usage, determine a maximum energy demand of the energy demand corresponding to each of the at least one energy usage over the known period, wherein the maximum energy demand is a maximum of an average value of the energy demand corresponding to the at least one energy usage determined in each of a plurality of second known time periods, determine a maximum total energy demand over the known period, wherein the maximum total energy demand is a maximum of an average value of the total energy demand determined in each of a plurality of the second known time periods, determine a cost of the total energy usage based on at least the total energy usage and the maximum total energy demand (360), determine a cost of the residual energy usage based on at least the determined residual energy usage and the maximum energy demand; and apportion the energy costs of equipment operation based on the cost of total energy usage and the cost of the residual energy usage.

In one aspect of the invention, the cost of the energy consumption or usage may include the environmental cost (i.e., environmental footprint, greenhouse gas emissions) for generating the energy consumed. The environmental cost, impact for greenhouse gas emission for generating the consumed or used energy may be known for each of a plurality of sources of energy generation. In addition, the cost of energy generation may be determined based on location of the generation source.

The advantages, nature, and various additional features of the invention will appear more fully upon consideration of the illustrative embodiments to be described in detail in connection with the accompanying drawings wherein like reference numerals are used to identify like elements throughout the drawings.

It is to be understood that the figures and descriptions of the present invention described herein have been simplified to illustrate the elements that are relevant for a clear understanding of the present invention, while eliminating, for purposes of clarity only, many other elements. However, because these eliminated elements are well-known in the art, and because they do not facilitate a better understanding of the present invention, a discussion of such elements or the depiction of such elements is not provided herein. The disclosure herein is directed also to variations and modifications known to those skilled in the art.

It will be further understood that the present invention is described with regard to a specific implementation of determining energy, cost and GHG emissions allocation for business-related (healthcare-related) equipment. However, it would be appreciated that the present invention may also be applicable to other situations, such as hotels or hospital, wherein energy usage may be determined based on a room usage without altering the scope of the invention.

Figure 1:
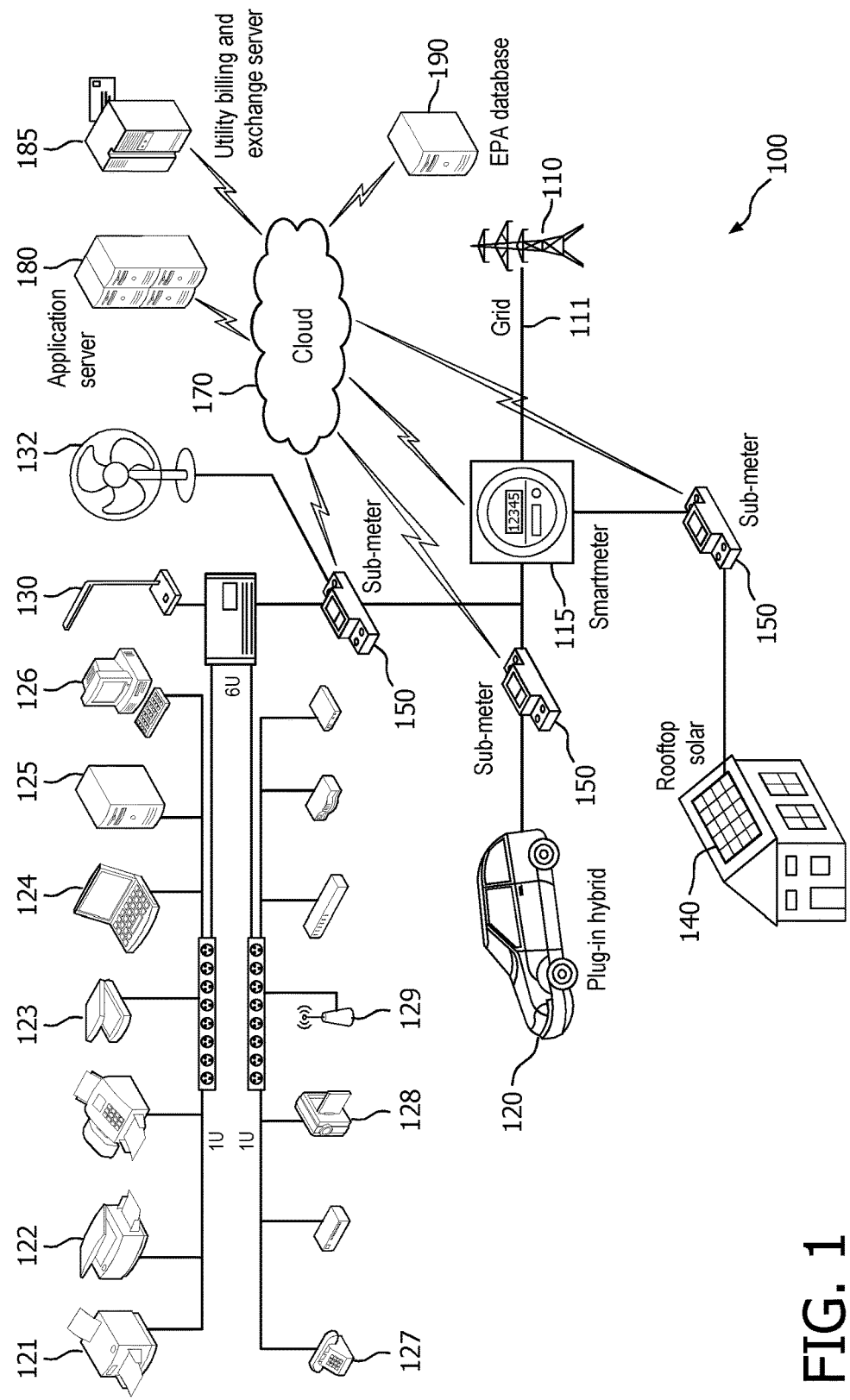
FIG. 1 illustrates an exemplary power distribution system with business related component usage.

FIG. 1 illustrates an exemplary architecture of a proposed system 100 in accordance with the principles of the invention.

Referring to FIG. 1, there is shown a power generation source 110 that provides electrical energy to a home or residence of a user. The home or residence is separate and remote from the user's employer's normal business location. Or, if the user is self-employed, the home or residence may be used for the user's business purposes. Or if the home includes healthcare equipment, then the energy cost for use of the equipment is to be separately determined. In any case, the energy consumed and/or the environmental footprint for the equipment are to be separately determined from the residential portion of energy used by the user's home or residence.

The electrical energy may be provided to the user's home or residence through a standard electrical grid (i.e., grid 111). And the amount of energy provided to the user's home or residence may be monitored and recorded by a meter 115. Meter 115 may be a standard meter for measuring the amount of electrical energy (power) provided to the home from the power source 110. As would be appreciated, meter 115 may represent a currently available meter used in millions of homes that include a separate communication device, as will be explained. Or meter 115 may be a newer meter type, which is referred to as a smart meter that not only measures the amount of energy or power consumed, but also, may collect data, such as time of day energy is consumed, so that the charge for the energy consumed may be adjusted based on the time of day. Smart meters are also being developed so that the energy provided to the user may be dynamically adjusted to avoid overloading the grid. A detailed discussion of such smart meters is beyond the scope of the present invention and need not be discussed in detail herein.

The supplied electrical energy may then be distributed throughout the home or residence through existing power lines within the home or residence. The power may be distributed to charge an electrically power-ed vehicle 120, or to one or more business related equipment, such as printer 121, fax machine 122, scanner 123, laptop computer 124, server 125, computer 126, telephone 127, video recorder 128, wireless router 129, etc. Or the power may be provided to healthcare equipment (not shown). In addition, lights 130 and fans 132 and air-conditioning (and heat) (not shown) may also be associated with the business-related (healthcare-related) energy costs and the environmental footprint related to business-related (healthcare-related) operations.

FIG. 1 further illustrates that the user's home or residence may include on-site means for energy generation. For example, solar panels 140 may be installed at the home. The solar panels 140 generate electrical energy that may be used during the daylight hours and, thus, reduce the amount of energy provided by the grid to the aforementioned equipment. In addition, the environmental footprint required for electrical energy consumed by the aforementioned equipment is complicated as the environmental footprint for the energy actually used is altered.

Although the electrical energy cost and environmental footprint is reduced during daylight hours using green electrical energy generated by solar panels, it would be recognized that during night time hours, the electrical energy is provided by the power generation facility 110 and, hence, the electrical energy cost and environment footprint is dependent upon the time of day that the equipment are used.

In addition, although not shown, it would be appreciated that other non-Green on-site electrical generation devices, e.g., diesel generators, may be used by the user. Thus, while the electrical energy costs associated with energy provided by the power generation facility 110 may be reduced, the environmental footprint may increase (or decrease) based on the cost of generating the energy and the manner in which the on-site energy is generated.

FIG. 1 further illustrates a plurality of meters 150, which monitor and measure electrical energy provided to the business-related (not shown healthcare-related) equipment. Meters 150 may, for example, represent plug-in modules that plug into existing power connections (i.e., outlets) into which equipment (business related, healthcare-related) are connected. Or meters 150 may represent hard-wired devices that are connected to the home or residence wiring. Alternatively the meter 150 may be a software based disaggregator that can disaggregate the energy used by specific set(s) of equipment from the aggregate energy consumption using a power profile of the equipment within the set(s) of equipment. A set of statistical approaches that extract power signature/pattern of a given equipment may applied to accomplish this.

Each of the meters 150 may include a network connection that provides information regarding energy consumption used by the equipment (business-related, healthcare-related). The network connection may be wired or wireless. The network connection may then provide the measured information to a network (i.e., cloud) 170 that forwards the collected information to the appropriate devices.

In addition, meter 115 may include a similar network connection (i.e., wired or wireless) that enables meter 115 to provide the total energy consumed and peak demand to the appropriate devices. The network connection associated with meter 115 may be integrated into newer types of meters or may be separated and attached to existing types of meters.

As would be appreciated, the cloud 170 may represent one or more networks through which the measured data may pass. For example, the cloud 170 may represent a router device (not shown) that creates a local area network (LAN) within the home or residence, to which each of the sub-meters 150 (and/or meter 115) may provide the measured information. The router device may accumulate the measured information and then provide the measured information to a broader network or a wide area network (WAN), such as the Internet, through a wireless or wired connection. The collected information may be provided to the appropriate devices on a periodic basis (e.g., every known time period) or may on an on-demand basis. As would be appreciated, in one embodiment of the invention, each meter 115 and meter 150 may individually provide the information over the network. Or the information in each meter 115, 150 may be collected in a local device (not shown) that then provides the collected data to the appropriate devices (periodically, on-demand).

The measured (collected) data (energy consumption) provided to the WAN may then be distributed to one or more devices for appropriate action. For example, the total electrical energy may be provided to a utility or power generation company for determining total energy consumed. In one aspect of the invention, data may be provided to an application server 180, which is used to determine that portion of the total energy (and associated environmental footprint) of the equipment. In addition, the application service 180 may receive information from a utility billing server 185 and/or an EPA (Environmental Protection Agency) database 190. The information from the utility billing server may provide information regarding the tariffs applied to the consumed energy. In addition, information from the EPA database may be used to determine the GHG emissions.

The application server 180 runs software that implement methods for determining the expenses for the energy consumed and GHG emissions (i.e., costs) due to home office or healthcare equipment. Application server 180 may reside in the cloud (i.e., remote location) or at home or in the office. Application server 180 retrieves provided information from the meter 115, sub-meters 150, utility billing and exchange server 185 and EPA database (e.g. eGRID) 190 to compute GHG emissions and energy costs due to home office and healthcare equipment.

The Emissions & Generation Resource Integrated Database (eGRID), is an EPA generated comprehensive source of data on the environmental footprint of electric power generated in the United States. These environmental characteristics include air emissions for nitrogen oxides, sulfur dioxide, carbon dioxide, methane, and nitrous oxide; emissions rates; net generation; resource mix; and many other attributes. As different parts of the country use different fuels to generate electricity, EPA divides the United States into sub-regions based on the method of generating electrical energy.

In addition, when the user's home or residence includes on-site electrical energy generating devices, then the energy generated by these on-site devices is also to be considered. Thus, the on-site electrical energy generating devices may be connected through meter 150, (or meter 115) which records the amount of energy provided by the on-site electrical energy generating devices. This on-site energy generation information (and the source of such energy generation) is further provided to cloud 170 for subsequent inclusion in the calculations performed by application server 180.

Figure 2:
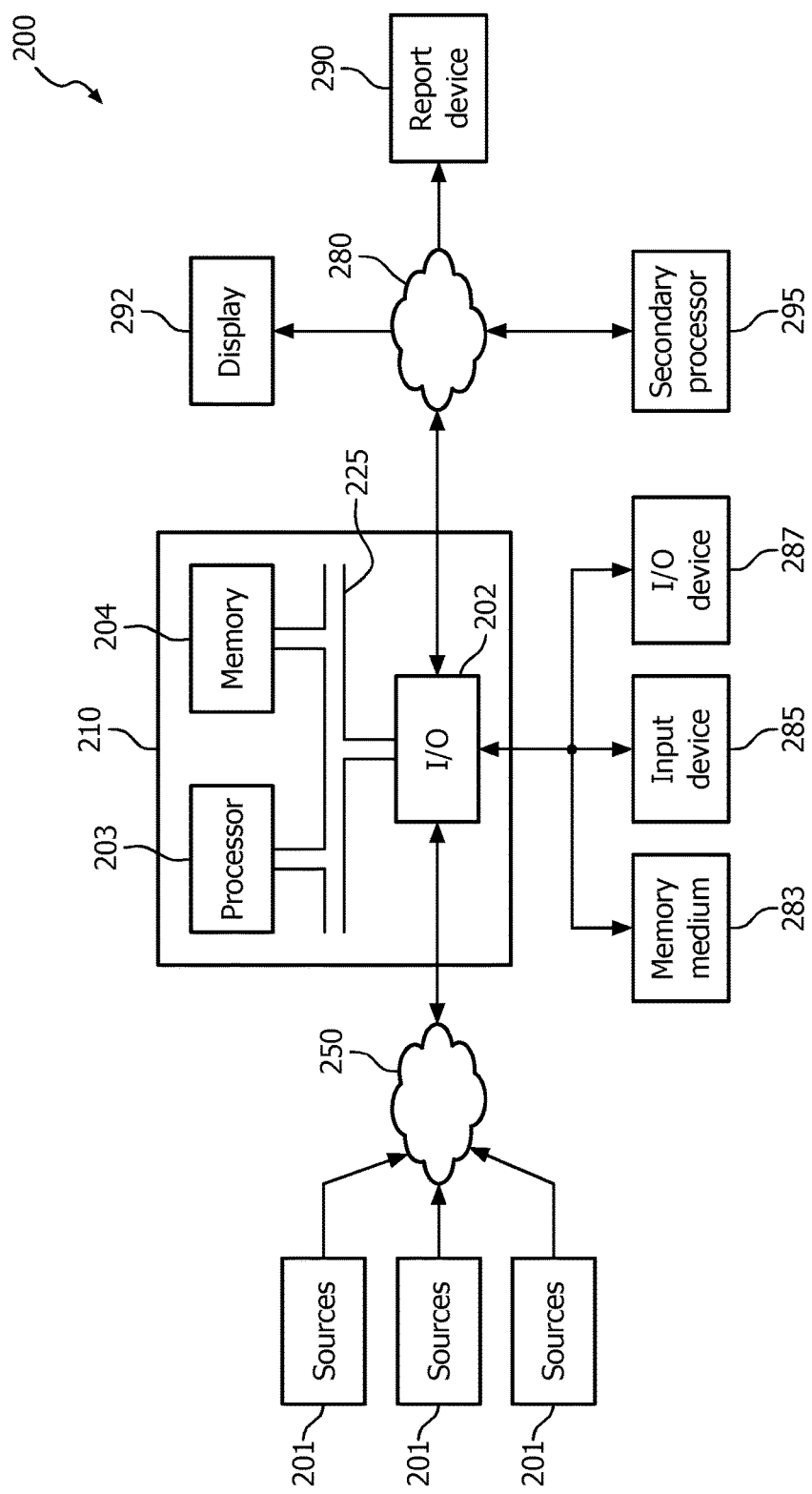
FIG. 2 illustrates a block diagram of an exemplary processing in accordance with the principles of the invention.

FIG. 2 illustrates a block diagram of a system that may be used to collect, record and determine energy usage contributions and greenhouse emission contributions.

Referring to FIG. 2, there is shown a system 200 for implementing the processing shown herein in accordance with the principles of the invention. In this exemplary system embodiment 200, input data is received from sources 201 (e.g., meters 115, 150) over network 250 (i.e., home power network) and is processed in accordance with one or more programs, either software or firmware, executed by processing system 210. The results of processing system 210 may then be transmitted over network 280 for viewing on display 292, reporting device 290 and/or a second processing system 295 (e.g., application server 180).

Processing system 210 includes one or more input/output devices 202 that receive data from the illustrated sources or devices 201 over network 250. The received data is then applied to processor 203, which is in communication with input/output device 202 and memory 204. Input/output devices 202, processor 203 and memory 204 may communicate over a communication medium 225. Communication medium 225 may represent a communication network, e.g., ISA, PCI, PCMCIA bus, one or more internal connections of a circuit, circuit card or other device, as well as portions and combinations of these and other communication media.

In one embodiment, processor 203 may include, or access, code which, when executed by the processor, performs the operations illustrated herein. The code may be contained in memory 204, may be read or downloaded from a memory medium, such as a CD-ROM or floppy disk, represented as 283, may be provided by a manual input device 285, such as a keyboard or a keypad entry, or may be read from a magnetic or optical medium (not shown) or via a second I/O device 287 when needed. Information items provided by devices 283, 285, 287 may be accessible to processor 203 through input/output device 202, as shown. Further, the data received by input/output device 202 may be immediately accessible by processor 203 or may be stored in memory 204. Processor 203 may further provide the results of the processing to display 292, recording device 290 or a second processing unit 295, as previously discussed.

Processing system 210 may also be in two-way communication with each of the sources 201. Processing system 210 may further receive or transmit data over one or more network connections from a server or servers over, for example, one or more of global computer communications networks, such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks.

By 2015, 65 million smart meters will be deployed in US. Smart meters record the electric energy usage data every 15 minutes. In the future, the data recording frequency will be even higher. In the US, many states are mandating utilities to share smart meter data with authorized third parties. To facilitate the seamless exchange of a retail customer's energy usage information between their designated data custodian (i.e., a distribution company) and an authorized third party service provider, the North American Energy Standards Board has created an Energy Services Provider Interface (ESPI) standard (REQ.21). The standardized interfaces and processes allow instant access to retail customer's granular energy data, weather data and energy prices escalation data over the web enabling novel application and services. Hence, the illustrated network connections, shown in FIG. 2, may include the ESPI standard, which is well known in the art, and need not be discussed in detail herein.

Although FIG. 2 has been described with regard to a generalized processing, it would be recognized that the block elements of FIG. 2 may also be applicable to the sub-meter 150, smart meter 115 and other devices that require processing capability.

Figure 3:
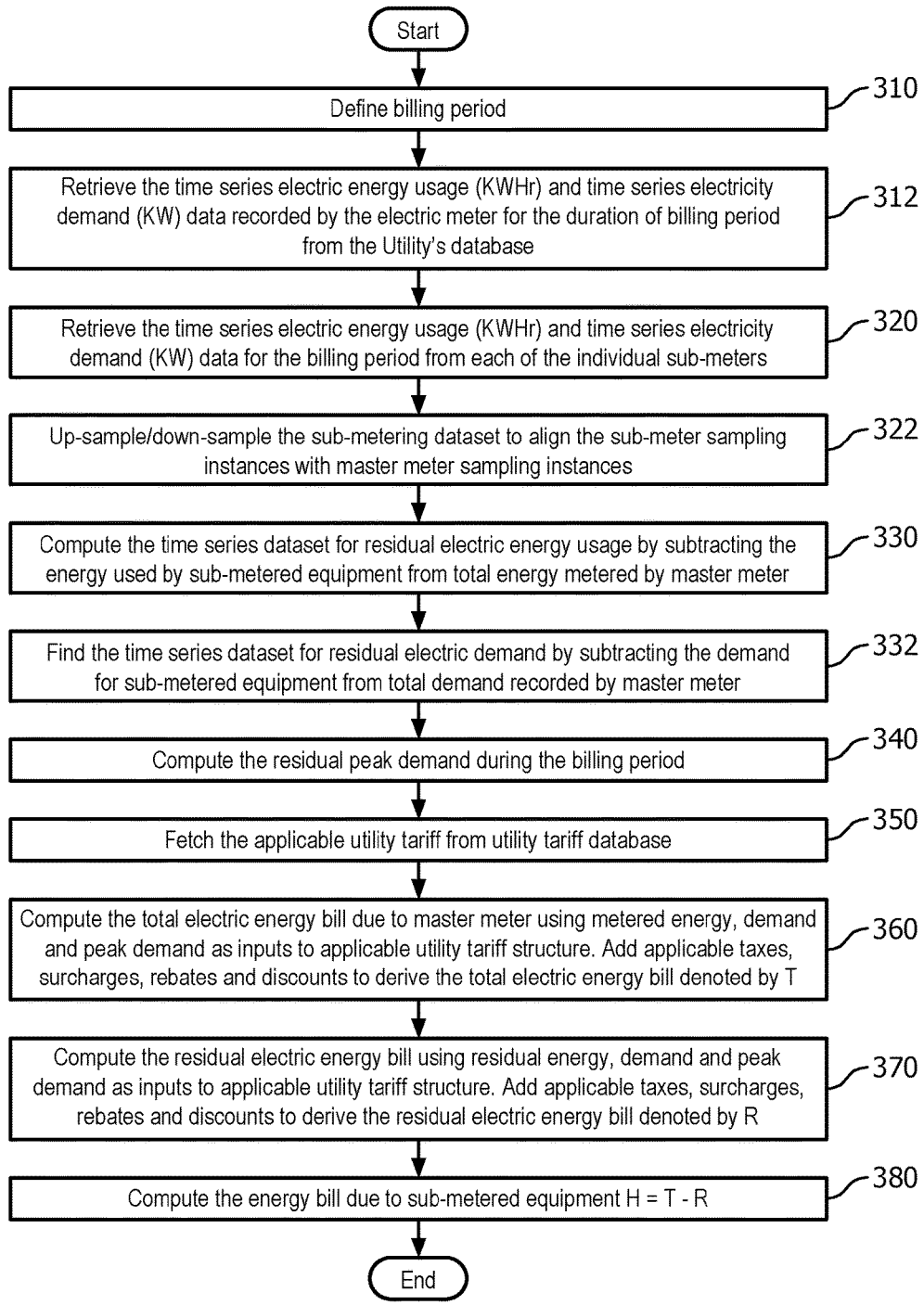
FIG. 3 illustrates a flow chart of exemplary process in accordance with the principles of the invention.

FIG. 3 illustrates a flow chart of an exemplary process 300 in accordance with the principles of the invention.

A billing period is defined at step 310. The billing period may be one of a day, a week, a month, or similar periods of time. In conventional billing systems, the billing period is typically on a monthly basis (i.e., meter 115 is read once per month). At step 320, the time series electric energy usage (Kilo Watt Hours) and time series electricity demand (Kilo Watt) data recorded by the domestic electric meter 115 for the duration of billing period is retrieved. Let $M_e$ denote the time series electric energy consumption metered by the master meter 115 during the billing period. Let $M_d$ denote time series electric demand metered by the master meter 115 during the billing period. Let $M_p$ denote the peak demand metered by the master meter 115 during the billing period.

At step 320 retrieve the time series electric energy usage (KWHr) and time series electricity demand (KW) data for the billing period from each of the individual sub-meters 150 metering the electricity usage and demand by home-office (healthcare) equipment and other devices (e.g., plug-in hybrid vehicle). Let $S^i_e$ denote the time series electric energy consumption sub-metered by sub-meter 150 $i$ during the designated billing period. Let $S^i_d$ denote the time series electric demand sub-metered by sub-meter 150 $i$ during the corresponding billing period.

At step 322, the sub-metering dataset is up-sample/down-sample to align the sub meter sampling instances with the master meter 115 sampling instances (i.e., collect the sub-meter data for the same period as the master meter 115). Letting $S^{ii}_e$ denote the time series electric energy consumptions sub-metered by sub-meter i that are fully aligned with metered dataset $M_e$.

At step 330, determine the time series dataset for residual electric energy usage excluding the energy used by sub-metered equipment as follows.

$$Re = Me - (S^{i1}_e + S^{i2}_e + S^{i3}_e + \ldots S^{iN}_e) \tag{1}$$

where N is the number of sub-meters.

At step 332, determine the time series dataset for residual electric demand excluding the demand for sub metered equipment as follows.

$$Rd = Md - (S^{i1}_d + S^{i2}_d + S^{i3}_d + \ldots S^{iN}_d) \tag{2}$$

where N is the number of sub-meters.

At step 340, the residual peak demand (Rp) is determined based on Rd as follows.

Using instantaneous demand Rd as the input, the average demand over a sliding window of known period of time (e.g., 15 minute) is computed for the entire billing period. The average demand over the known period is represented as $Rd_a$. Then the maximum value of $Rd_a$ within the billing period is computed, which is denoted as peak demand Rp.

$$Rd_a = \max(Rd_j) \tag{3}$$

where j=window period

A similar process is used to compute a maximum demand, Mp, from Md.

$$Md_a = \max(Md_j) \quad (4)$$

where j=window period

At step 350, applicable utility tariffs, are obtained from a utility tariff database. The applicable utility tariff may be pre-loaded or may be obtained from the utility data base. Utility tariff structure may incorporate time-of-use, interruptible blocks, ratchet, seasonally differentiated, declining blocks, real-time pricing and/or peak demand charges.

At step 360, the total electric energy bill (T) is determined using Me, Md and Mp as inputs to the applicable utility tariff structure. The total electrical energy bill may further include applicable taxes, surcharges, rebates and discounts to derive the total electric energy bill. As would be recognized, the applicable taxes (local, State and Federal) are determined based on the location of the energy consuming equipment. Similarly, surcharges, rebates and discounts may be determined based on the location of the energy consuming equipment and the means for generating the electrical energy.

A simple example for calculating monthly electricity bill is given below. Suppose Me=1000 KWHr and Mp=10 KW. The computation of the total cost does not include any penalties charged by the utility or the retail electric provider to the home owner for disconnect, reconnect, late payment, or other similar service charges that are not related to actual usage. However, the cost may include the discounts and rebates credited by the utility or the retail electric provided to the home owner for energy efficiency upgrades and like.

| Charge type | Cost basis | Units used | Cost |
|---|---|---|---|
| Monthly energy usage charges | 0.1$/KWhr | 1000 KWhr | 100$ |
| Monthly demand charges | 10$/KW | 10 KW | 100$ |
| Taxes | 10% | | 20$ |
| Surcharge | 5% | | 10$ |
| Monthly customer charge | 10$ | | 10$ |
| Monthly utility rebate | 20$ | | −20$ |
| Total monthly bill | | | 220$ |

At step 370, the residual electric energy bill (R) using Re, Rd and Rp as inputs to applicable utility tariff structure is determined. As discussed, the utility tariff structure could be based on time-of-use, real-time pricing and/or peak demand charges. Again, the applicable taxes, surcharges, rebates and discounts are incorporated into the residual electrical energy bill to determine the residual electric energy bill.

For example, Re=500 KWHr and Rp=5 KW. Following table shows the computation of R. Note that the monthly customer charge is not apportioned based on usage because the customer would have paid the fixed monthly customer charge irrespective of home-office/healthcare equipment use. Similarly the monthly utility rebate is applied entirely to R presuming that customer is receiving this rebate for energy efficiency upgrade of his/her home which is not tied to home-office/healthcare equipment.

| Charge type | Cost basis | Units used | Cost |
|---|---|---|---|
| Energy usage charges | 0.1$/KWhr | 500 KWhr | 50$ |
| Demand charges | 10$/KW | 5 KW | 50$ |
| Taxes | 10% | | 10$ |
| Surcharge | 5% | | 5$ |
| Monthly customer charge | 10$ | | 10$ |
| Monthly utility rebate | 20$ | | −20$ |
| Total monthly bill | | | 105$ |

At step 380, the energy bill due to sub-metered equipment is computed as:

$$H = T - R \quad (5)$$

Note that some homes have rooftop solar units or other means of local power generation. The homeowner may sell excess power to the utility. In that case, instead of computing the incremental bill payable to utility due to home-office equipment usage (in a given billing period), the process disclosed herein, may further determine any additional proceeds the home owner may gain (in the billing period) by selling additional power if all the office equipment were turned off.

An organization can further use the Green power for home-office equipment to reduce the emissions associated with its electricity use. EPA defines Green power as renewable electricity produced from solar, wind, geothermal, biogas, biomass, and low impact small hydroelectric sources. Green power sources produce electricity with an environmental profile superior to conventional power technologies. Green power produce no anthropogenic (human caused) greenhouse gas emissions.

The emission factors for Green power purchases are treated differently than non-Green powers sources. The emissions due to Green power sources are actually equivalent emission reductions (i.e. negative emissions). Negative emissions due to Green power can be used to offset positive emissions due to non-Green power.

Figure 4:
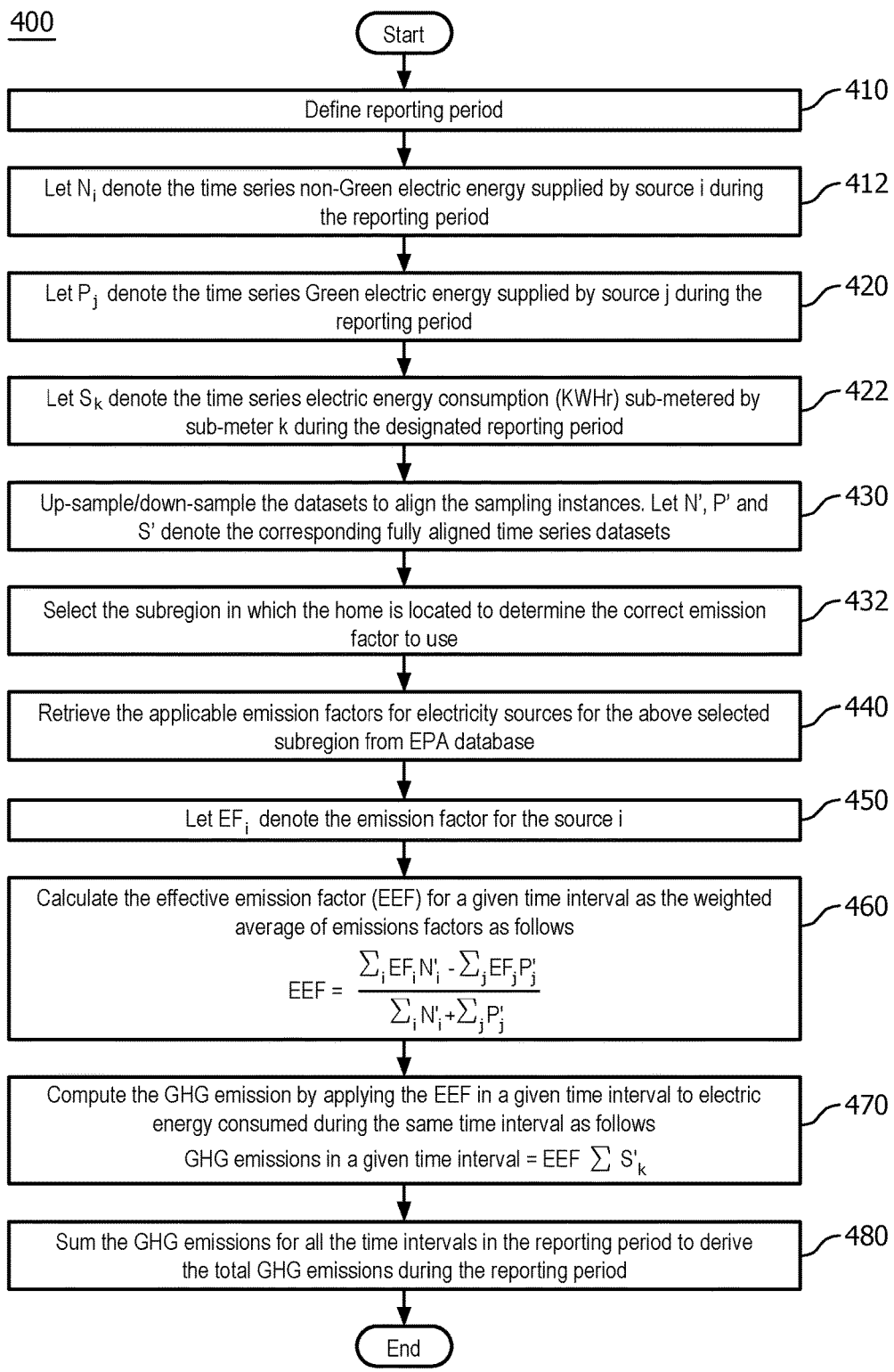
FIG. 4 illustrates a flow chart of a second exemplary process in accordance with the principles of the invention.

FIG. 4 illustrates a flow chart of an exemplary process 400 in accordance with the principles of the invention for determining the GHG emissions (i.e., environmental costs). At step 410, define a reporting period. At step 412, let $N_i$ denote a time series non-Green electric energy supplied by source i during the reporting period. At step 420, let $P_j$ denote a time series Green electric energy supplied by source j during the reporting period. At step 422, retrieve the time series electric energy usage (KWHr) for the reporting period from each of the individual sub-meters 115 measuring the electricity usage by home-office equipment (healthcare equipment and/or plug-in hybrid vehicle if applicable). Let $S_k$ denote the time series electric energy consumption sub-metered by sub-meter k during the designated reporting period. At step 430, up-sample/down-sample the datasets to align the sampling instances with the billing period, as previously discussed. Let N', P' and S' denote the corresponding fully aligned time series datasets. At step 432, select the sub-region in which the home (or site) is located to determine the correct emission factor to use. The sub-region or site can be determined by entering a zip code or an address into the EPA's Power Profiler data base. (www.epa.gov/powerprofiler). At step 440, the applicable emission factors for electricity sources for the above selected sub-region are retrieved from the EPA database.

At step 450, let $EF_i$ denote the emission factor for the source i. Note that if source i is supplying Green power then we use non-based load emission factors. Otherwise for non-Green power sources we use the system average emission factors.

At step 460, calculate the effective emission factor (EEF) for the time interval as a weighted average of emissions factors as follows.

$$EEF = \frac{\sum_i EF_i N'_i - \sum_j EF_j P'_j}{\sum_i N'_i + \sum_j P'_j} \quad (6)$$

Note that EEF varies depending on contributions of different sources of electricity in the total mix of electricity. Hence, the EEF for different intervals of time can be different. Thus, the EEF may be represented as a negative value.

At step 470, determine the GHG emission by applying the EEF in the time interval derived above to electric energy consumed by the equipment during the same time interval as follows.

$$\text{GHG emissions in a given time interval} = EEF \Sigma S'_k \quad (7)$$

In this case, the sum shown in equation 5 is taken over all sub-meters k that measure the power consumed by home-office equipment. One meter can meter power consumption of many devices. However; power consumed by a device is metered by one and only one sub-meter. Together all the sub-meters account for total power consumed by home-office equipment.

At block 480, a sum the GHG emissions for all the time intervals in the reporting period is performed to derive the total GHG emissions during the reporting period.

Although not shown, it would be recognized that the above process may be repeated for all major GHGs: carbon dioxide ($CO_2$), methane ($CH_4$), nitrous oxide ($N_2O$), hydroflurocarbons (HFCs), perfluorocarbons (PFCs), and sulfur hexafluoride ($SF_6$). This method estimate GHG emissions from Direct, Indirect and optional sources.

The above method assumes that the composition of electricity used by home-office and rest of the home is the same. In yet another embodiment the organization may preferentially use Green power for home-office equipment. In that case it will apply green power to the home-office equipment to the maximum extent possible and if the green power is not sufficient to meet electricity needs of the home-office equipment then it will use non-green power for the remaining needs. This will enable organization to offset some of the emissions incurred elsewhere by other activities.

Figure 5:
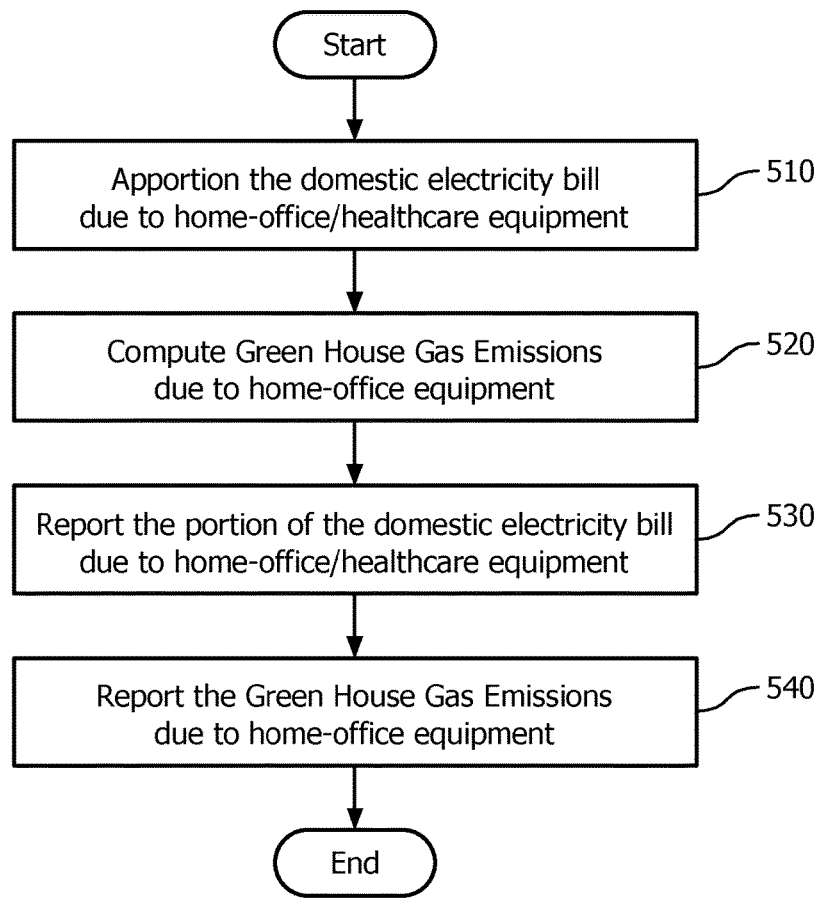
FIG. 5 illustrates a flow chart of an exemplary process in accordance with the principles of the invention.

FIG. 5 illustrates an exemplary flowchart 500 of an exemplary process for determining cost of energy consumption and environmental footprint (GHG emission) of business-related (healthcare-related) equipment in accordance with the principles of the invention.

Referring to FIG. 5, at step 510, the cost of energy consumed by the equipment is determined as previously discussed. The cost includes factors such as on-site and off-site energy generation. At step 520, a determination is made regarding the Greenhouse Gas emissions resulting from the energy consumed with regard to the equipment. At block 530, a report is prepared regarding the cost of electrical energy used by the equipment is provided. In addition, the total cost and the user's personal costs may be reported. Alternatively, only the business/healthcare portion of the cost may be reported to ensure the privacy of the user. At block 540, a further report may be provided regarding the total environmental impact and the portion of the total that is associated with the separately monitored equipment.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although, a computer, a processor and/or dedicated hardware/software are described herein as being capable of processing the processing described herein, it would be recognized that a computer, a processor and/or dedicated hardware/software are well-known elements in the art of signal processing and, thus, a detailed description of the elements of the computer, processor and/or dedicated hardware need not provided in order for one skilled in the art to practice the invention described, herein.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are

What is claimed is:

1. A method, operable in a processor, for apportioning energy costs for equipment operation, said method causing said processor to execute the steps comprising:
   receiving, from at least one sub-meter, at least one energy usage and an energy demand corresponding to each of said at least one energy usage during a known period;
   receiving, from a master-meter, a total energy usage and a corresponding total energy demand during said known period;
   determining a residual energy usage from said total energy usage and said at least one energy usage and a residual energy demand from said total energy demand and said energy demand corresponding to each of said at least one energy usage;
   determining a maximum energy demand over said known period, wherein said maximum energy demand is a maximum of an average value of said energy demand corresponding to each of said at least one energy usage determined in each of a plurality of second known periods;
   determining a maximum total energy demand over said known period wherein said maximum total energy demand is a maximum of an average value of said received total energy demand determined in each of said plurality of second known periods;
   determining a cost of said total energy usage based on at least said total energy usage and said maximum total energy demand;
   determining a cost of said residual energy usage based on at least said determined residual energy usage and said maximum residual energy demand;
   apportioning said energy costs of equipment operation based on said cost of said total energy usage and said cost of said residual energy usage; and
   determining a source of energy generation of said total energy usage and each of said at least one energy usage;
   retrieving a greenhouse gas (GHG) emission value associated with the source of generation of said total energy usage and each of said at least one energy usage;
   determining an effective emission factor based on the determined sources of energy generation; and
   determining the GHG emission based on the effective emission factor.

2. The method of claim 1, wherein said determining said cost of said total energy usage and said residual energy usage comprises:
   applying a tariff of energy generation and appropriate taxes to each of said total energy usage, said maximum energy demand, said residual energy usage and said maximum residual energy demand.

3. The method of claim 2, wherein said tariff is based on at least one of: a time of day, a seasonal period and a source of energy generation.

4. The method of claim 1, wherein said GHG emission factor is predetermined for each of said source of energy generation.

5. The method of claim 1, wherein said GHG emission factor is determined for each source of energy generation based on at least a location of said source of energy generation.

6. The method of claim 5, wherein said location is determined based on one of: a sub-region, a zip code, and an address.

7. The method of claim 1, wherein said GHG emission is associated with at least one of: carbon dioxide ($CO_2$), methane ($CH_4$), nitrous oxide ($N_2O$), hydroflurocarbons (HFCs), perfluorocarbons (PFCs), and sulfur hexafluoride (SF6).

8. The method of claim 1, further comprising:
   aligning said total energy usage and each of said at least one energy usage in said known time period.

9. A system for apportioning energy costs for equipment operation, comprising:
   an application server comprising:
      a processor in communication with a memory, said memory including code which when assessed by the processor causes the processor to:
         receive, from at least one sub-meter, at least one energy usage and an energy demand corresponding to each of said at least one energy usage during a known period;
         receive, from a master-meter, a total energy usage and a corresponding total energy demand during said known period;
         determine a residual energy usage from said total energy usage and said at least one energy usage and a residual energy demand from said total energy demand and each of said energy demand corresponding to each of said at least one energy usage;
         determine a maximum energy demand over said known period, wherein said maximum energy demand is a maximum of an average value of said energy demand corresponding to each of said at least one energy usage determined in each of a plurality of second known periods;
         determine a maximum total energy demand over said known period wherein said maximum total energy demand is a maximum of an average value of said received total energy demand determined in each of said plurality of second known period;
         determine a cost of said total energy usage based on at least said total energy usage and said maximum total energy demand;
         determine a cost of said residual energy usage based at least on said determined residual energy usage and said maximum residual energy demand;
         apportion said energy costs of equipment operation based on said cost of said total energy usage and said cost of said residual energy usage; and
         determine a source of energy generation of said total energy usage and each of said at least one energy usage;
         retrieve a greenhouse gas (GHG) emission factor associated with the source of generation of said total energy usage and each of said at least one energy usage;
         determine an effective emission factor based on the determined sources of energy generation; and
         determine a total GHG emission based on the effective emission factor.

10. The system of claim 9, wherein said determining a cost of said total energy usage and said residual energy usage comprises:
   obtaining a tariff of energy generation and appropriate taxes; and applying said tariff and said appropriate taxes to each of said total energy usage, said maximum energy demand, said residual energy usage and said maximum residual energy demand.

11. The system of claim 10, wherein said tariff is based on at least one of: a time of day, a seasonal period and a source of said energy generation.

12. The system of claim 9, further comprising:
determine a source of energy generation of said total energy usage and each of said at least one energy usage;
retrieve a GHG emission factor associated with the source of generation of said total energy usage and each of said at least one energy usage;
determine an effective emission factor based on the determined sources of energy generation; and
determine a total GHG emission based on the effective emission factor.

13. The system of claim 12, wherein said GHG emission factor is predetermined for each source of energy generation.

14. The system of claim 12, wherein said GHG emission factor is determined for each source of energy generation based on at least a location of said source of generation.

15. The system of claim 14, wherein said location is determined based on one of: a sub-region, a zip code, and an address.

16. The system of claim 12, wherein said GHG emission is associated with at least one of: carbon dioxide ($CO_2$), methane ($CH_4$), nitrous oxide ($N_2O$), hydroflurocarbons (HFCs), perfluorocarbons (PFCs), and sulfur hexafluoride (SF6).

17. The system of claim 9, the processing further executing the step of:
aligning said total energy usage and each of said at least one energy usage in said known time period.

18. The system of claim 9, further comprising at least one network providing a respective communication link between said application server and each of said at least one sub and master meters.

19. A non-transitory device containing a computer program product for apportioning costs of equipment operation, said computer program product representing computer instructions, which when accessed by a processor, causes the processor to:

receive, from at least one sub-meter, at least one energy usage and an energy demand corresponding to each of said at least one energy demand during a known period;
receive, from a master-meter, a total energy usage and a corresponding total energy demand during said known period;
determine:
a residual energy usage from said total energy usage and said at least one energy usage; and
a residual energy demand from said total energy demand and each of said energy demand corresponding to each of said at least one energy usage;
determine a maximum energy demand corresponding to each of said at least one energy usage over said known period, wherein said maximum energy demand is a maximum of an average value of said energy demand corresponding to said at least one energy usage determined in each of a plurality of second known time periods;
determine a maximum total energy demand over said known period wherein said maximum total energy demand is a maximum of an average value of said total energy demand determined in each of a plurality of said second known time periods;
determine a cost of said total energy usage based on at least said total energy usage and said maximum total energy demand;
determine a cost of said residual energy usage based on at least said determined residual energy usage and said maximum energy demand;
apportion said energy costs of equipment operation based on said cost of total energy usage and said cost of said residual energy usage; and
determine a source of energy generation of said total energy usage and each of said at least one energy usage;
retrieve a greenhouse gas (GHG) emission factor associated with the source of generation of said total energy usage and each of said at least one energy usage;
determine an effective emission factor based on the determined sources of energy generation; and
determine a total GHG emission based on the effective emission factor.

* * * * *